United States Patent [19]

Bertossa

[11] Patent Number: 4,575,611
[45] Date of Patent: Mar. 11, 1986

[54] METHOD OF JOINING PIPES

[75] Inventor: Donald C. Bertossa, Saratoga, Calif.

[73] Assignee: General Electric Company, San Jose, Calif.

[21] Appl. No.: 686,560

[22] Filed: Dec. 26, 1984

[51] Int. Cl.⁴ .......................... B23K 31/06; B23K 9/02
[52] U.S. Cl. .................................. 219/137 R; 219/61; 219/59.1; 285/286
[58] Field of Search .................. 219/137 R, 59.1, 136, 219/137 WM, 60 R, 61, 76.12, 76.14; 228/119, 189; 285/286, 15

[56] References Cited

U.S. PATENT DOCUMENTS

| | | | |
|---|---|---|---|
| 1,313,387 | 8/1919 | Kaarbo | 228/189 |
| 1,872,240 | 8/1932 | Burnsh | 228/189 |
| 1,961,117 | 5/1934 | Wall | 228/216 |
| 2,792,490 | 5/1957 | Risch et al. | 219/61 X |
| 2,943,387 | 10/1957 | Dawson | 285/286 |
| 3,001,497 | 9/1961 | Thielsch | 285/286 X |
| 3,629,932 | 12/1971 | Richter | 228/189 |
| 4,049,186 | 9/1977 | Hanneman et al. | 228/119 |
| 4,073,427 | 2/1978 | Keifert et al. | 228/165 |
| 4,234,119 | 11/1980 | Masaoka et al. | 228/125 |
| 4,348,041 | 9/1982 | Imai et al. | 285/286 |
| 4,408,112 | 10/1983 | Kazlauskas | 219/137 R X |

FOREIGN PATENT DOCUMENTS

| | | | |
|---|---|---|---|
| 109577 | 8/1980 | Japan | 219/59.1 |
| 126386 | 9/1980 | Japan | 219/59.1 |

Primary Examiner—Clarence L. Albritton
Assistant Examiner—Catherine M. Sigda
Attorney, Agent, or Firm—Ivor J. James, Jr.; Samuel E. Turner; Raymond G. Simkins

[57] ABSTRACT

A method of replacing a defective circumferential butt joint in a metal pipe is disclosed. An annular metal bridge ring, having a smaller wall thickness than the pipe but the same inside diameter, is positioned coaxial with the pipe in the relatively wide gap created by the removal of the defective joint. The ring becomes an integral part of the weld by being welded in place, thereby partially filling the gap between the edge surfaces of the pipe exposed by the removal of the defective joint. Subsequent layers of fusible material are weld deposited in place on top of the ring until the gap is filled to the exterior pipe surface. Use of the ring in the gap enables replacement of the defective joint with a single weld.

29 Claims, 3 Drawing Figures

METHOD OF JOINING PIPES

The present invention relates in general to a method of joining metal pipe sections at their edge surfaces and more particularly to a method for replacing defective circumferential butt welds in existing austenitic stainless steel pipe systems.

BACKGROUND OF THE INVENTION

When austenitic stainless steel pipe sections are joined at their edge surfaces by welding or similar fusing technique, the pipe wall areas immediately adjacent to the weld are caused to heat up. This heating of some types of austenitic stainless steel during welding is known to result in a metallurgical change involving precipitation of carbides at the grain boundaries. In addition, welding causes residual tensile stresses to develop in the immediate region of the weld. The combination of these elements in the presence of certain corrosive environments can promote cracking in the weld region of the pipe wall.

Recent installations generally use low carbon stainless steels, as well as stress redistribution techniques, to minimize the susceptibility of such welded pipes to stress corrosion cracking. However, the problem persists due, in part, to the types of stainless steel originally used and the welding methods employed. The occurrence of stress corrosion cracking in such installations has presented serious problems. Failure to correct the condition can lead to pipe leaks and the attendant downtime for pipe repair.

Repair procedures have been used in the past that require the removal and replacement of an entire pipe section in such an installation. A repair of that magnitude often entails long down time periods and is consequently expensive to carry out. Further, the installation of the new pipe section requires two separate butt welds, i.e. one more than the defective weld that is replaced. Aside from the additional labor required, each such additional weld lengthens the down time of the installation due to the time required for welding as well as the time for additional weld inspection required both when the repair is made and in future in-service inspections. Thus, if it is possible to do so within the constraints imposed by safety, inspection and other operational requirements of the installation, it is clearly preferable to replace the defective weld with a single new weld rather than to install a pipe section.

In certain installations, piping must be operated at high pressures. Such piping may also carry dangerous substances. In such applications, any pipe failure may represent an unacceptably high risk to workers, to the public, or to the continued integrity of the installation of which the piping is a part. Thus, when a pipe joint is repaired, the repaired joint must be of a quality and integrity which is in conformance with pertinent industry standards and which is no less than the quality and integrity of the remainder of the pipe.

Various solutions have been proposed to the problem of repairing austenitic stainless steel pipe weld joints in which stress corrosion cracking has occurred. One repair procedure known in the art calls for build-up welding on top of the defective weld zone to be repaired. Typically this procedure is carried out while maintaining a liquid coolant in contact with the inside surface of the pipe in the vicinity of the aforesaid weld zone. Cooling at the pipe interior during exterior welding results in the redistribution of stress in the weld region, thereby placing the interior surface of the pipe in compression. Thus, the pipe becomes more resistant to stress corrosion cracking. However, the beneficial effects of the cooling procedure may be limited where the pipe wall is so thick as to prevent the required temperature gradient from being developed or existing cracks in the pipe wall extend beyond the region placed in compression. Further, the procedure fails to correct such stress corrosion cracking as has already occurred and merely welds fusible material on top of the defective weld joint.

Another known weld repair procedure is disclosed in U.S. Pat. No. 4,234,119. In accordance with one embodiment of the procedure outlined in that patent, all but the root layer of the original weld is removed. This is followed by rewelding while liquid coolant is maintained in contact with the inside pipe surface at the weld zone. It is stated in the patent that while the effect of cooling in this procedure is similar to that described above, the technique is further effective in eliminating existing stress corrosion cracks. Experience has, however, shown this may not be borne out in practice. By confining the repair to the original weld without replacing the susceptible weld heat-affected zones on opposite sides of it and completely fusing the root layer, such a technique leaves the integrity of the repaired joint in doubt and further sensitizes the original weld heat-affected zones to stress corrosion.

Other techniques are known in the art which redistribute stress in the weld region. However, most of these techniques only serve to arrest existing stress corrosion cracking in the pipe, without repairing or replacing the weld where such cracking has already occurred.

To deal effectively with the problems outlined above, it is necessary to remove not only the weld, but also the adjacent defective heat-affected zones and to replace them with a new joint having a stress distribution that furthers resistance to stress corrosion cracking. However, the removed portions leave a relatively large gap in the pipe, which is difficult to bridge with an ordinary weld. Though it is known in the art to use spacer strips, backing strips, or fusible metal inserts during welding in order to facilitate the joining of two pieces of metal across a gap, the problem of the large gap in a pipe where the inside surface is not accessible after welding is not addressed. As a consequence, there currently exists no effective, simple and inexpensive method for repairing or replacing a defective circumferential butt weld joint in an austenitic stainless steel pipe, which is capable of bridging a relatively large gap and which provides a new weld joint that resists corrosion cracking and which is of an integrity at least equal to that of the remainder of the pipe so as to conform to applicable industry safety standards.

OBJECTS OF THE INVENTION

It is a principal object of the present invention to provide a new and improved method for joining pipes susceptible to stress corrosion cracking which is not subject to the aforementioned problems and disadvantages.

Another object of the present invention is to provide a new and improved method of welding pipe sections, which yields a pipe joint free of stress corrosion cracks.

A further object of the present invention is to provide a new and improved method of replacing a defective pipe weld that does not increase the number of welds in the pipe, or require the removal of a pipe section.

Yet another object of the present invention is to provide a weld replacement method that produces a reliable pipe joint which conforms with pertinent industry safety standards.

An additional object of the present invention is to provide a method of replacing a defective weld in a pipe that can be used where the gap left by the removal of the original weld is relatively large.

Yet another object of the present invention is to provide a method of replacing a weld that can be performed relatively quickly and by a workman with average skill.

SUMMARY OF THE INVENTION

The foregoing objects of the present invention are achieved through a new and improved method of joining two sections of pipe which utilizes an interposed annular bridge ring. The use of the bridge ring enables two sections of pipe with a relatively wide gap between them to be joined with a single weld joint. The method may be practiced on austenitic stainless steel pipes as well as on other alloys and combinations of alloys. When applied to the replacement of a defective weld joint in a pipe, the defective joint, including the weld and the adjacent heat-affected zones, is first removed from the pipe and the edge surfaces of the pipe on opposite sides of the remaining gap are shaped for welding. After the annular bridge ring is inserted into the gap, fusible inserts are positioned on both sides of the ring between facing edge surfaces of the ring and pipe sections. An atmosphere of inert gas is provided in the gap region and the inserts are fused to the facing edge surfaces to form a root layer in the gap. Additional layers of a fusible material are then deposited on the inserts by fusing to achieve a desired thickness adjacent the ring. The inert gas atmosphere is then removed and further layers of a fusible material are deposited over the full width of the gap until the remainder of the gap is filled.

DETAILED DESCRIPTION OF THE DRAWINGS

Figure 1:
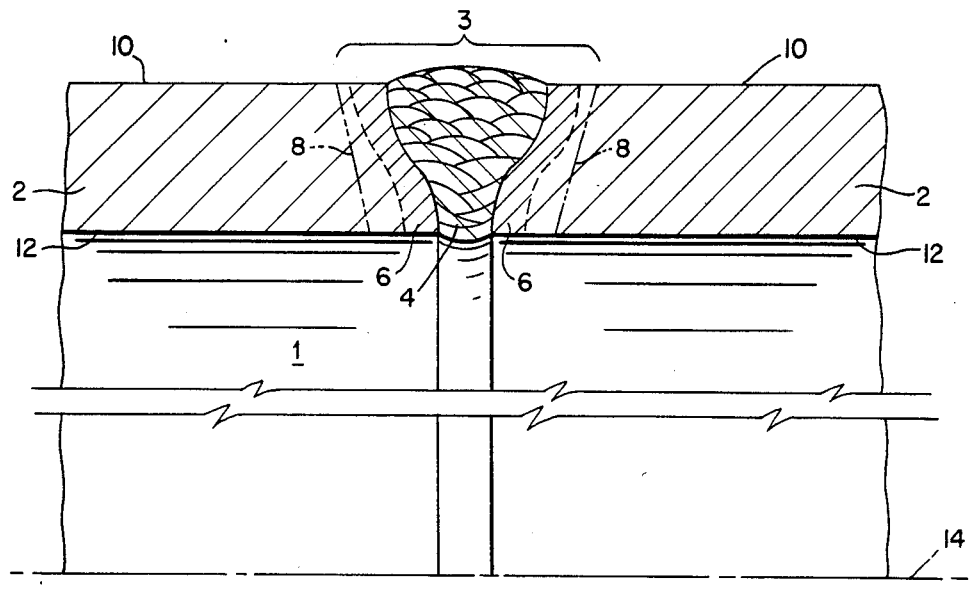
FIG. 1 is a half-sectional view of a defective weld taken in a plane through the pipe axis.

Referring now to the drawings, FIG. 1 shows a half-section of a pipe 1 having an axis 14 and consisting of austenitic stainless steel or similar material in which the butt weld 4 has become defective. Pipe 1 includes pipe wall 2, an exterior pipe surface 10 and an interior pipe surface 12. In accordance with a preferred embodiment of the invention, the repair of pipe 1 is initiated by removing the defective butt weld 4, as well as the adjacent weld heat-affected zones 6. Cutting of the pipe proceeds generally along lines 8, thereby creating a circumferential gap 3 in the pipe.

Figure 2:
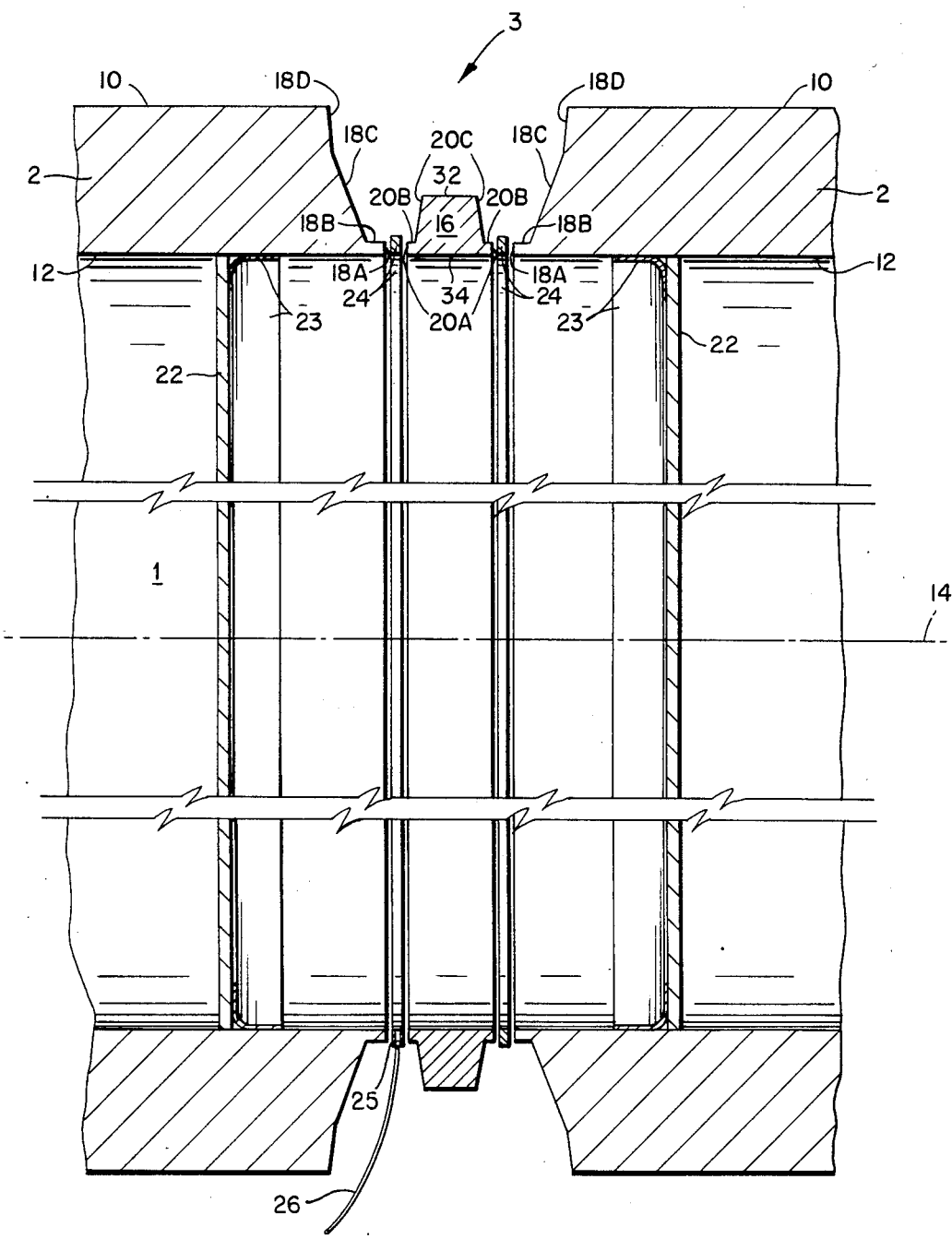
FIG. 2 is a sectional view showing a stage in the repair of the pipe.

Next, the confronting pipe edge surfaces that are left by cutting along lines 8 are machined to provide a predetermined configuration. While the configuration may differ with pipe wall thickness and preferences of the workman, the configuration used in a preferred embodiment of the invention is illustrated in FIG. 2. The drawing shows a full section of a thickwalled pipe under repair, each pipe edge surface 18 contains symmetrical first, second, third and fourth pairs of edge surface portions 18A–18D respectively, within the wall thickness of the pipe. Corresponding portions of the respective surfaces 18 are substantially identical and are symmetrically disposed with respect to the center of gap 3. Pipe edge surface portions 18A start at interior pipe surface 12 and lie in a pair of mutually spaced planes substantially perpendicular to pipe axis 14. Surface portions 18A define a first gap section between them which constitutes the narrowest part of gap 3. Pipe edge surface portions 18B extend outward from the first gap section, in opposite axial directions. Each of pipe edge surface portions 18C inclines outward from a pipe edge surface portion 18B, so as to further widen gap 3. Finally, pipe edge surface portions 18D, which are adjacent to exterior pipe surface 10, are machined so that they likewise incline in an outward direction, but at a steeper angle relative to pipe axis 14 than surface portions 18C. As stated above, the configuration chosen may vary with the preference of the workman. In general, the configuration is selected to minimize the amount of metal deposited, while maintaining suitable access for the welder or welding machine operator.

The next step in the procedure calls for inserting a pair of gas proof, water soluble diaphragms 22, each having a diameter substantially equal to the inside diameter of pipe 1, into the pipe through gap 3. The diaphragms, which may be fabricated from a paper which is commercially available as Dissolvo type WLD 60, are adhered to the interior surfaces of the pipe on opposite sides of the gap, e.g. by use of a water soluble tape 23 such as Dissolvo type WAT N. The diaphragms thus serve as gas dams, i.e. a pair of substantially gas tight seals that isolate the gap region from the remainder of the pipe interior.

After the gas dams have been put in place, an annular metal bridge ring 16, consisting of austenitic stainless steel or other appropriate corrosion resistant material, is positioned in gap 3 coaxial with pipe 1. As shown, ring 16 has a wall thickness less than that of the pipe and an interior diameter substantially equal to the interior pipe diameter. Edge surfaces 20 of the ring are configured to provide symmetrical pairs of first, second and third edge surface portions 20A–20C, respectively within the wall thickness of the ring. Ring edge surface portions 20A are adjacent interior ring surface 34. Surface portions 20A are substantially parallel to pipe edge surface portions 18A to define a pair of narrow gap portions therebetween within the aforementioned first gap section. Ring edge surface portions 20B extend in opposite axial directions toward the gap center. Ring edge surface portions 20C incline toward the center of the gap and are adjacent exterior ring surface 32.

A pair of fusible inserts 24 is positioned on opposite sides of bridge ring 16, between the bracketing edge surfaces of the ring and pipe. Inserts 24 consist substantially of type of fusible material compatible with the pipe and ring materials and resistant to corrosion. For example, for a type 304 stainless steel pipe and a type 316L stainless steel ring, the inserts may consist of a fusible material commercially available as consumable Grinnel weld inserts, type ER 308L. One of the fusible inserts is drilled to provide an aperture 25 through which an inert gas, such as argon, is piped from or source in conduct 26 under pressure into the interior of the pipe. In this manner an atmosphere of the inert gas is created inside the pipe, limited to the gap region by the pair of gas proof diaphragms 22. The gas so injected is maintained under positive pressure to prevent the surrounding atmosphere from invading the gap region, where the molten metal during welding would otherwise be oxidized excessively.

Figure 3:
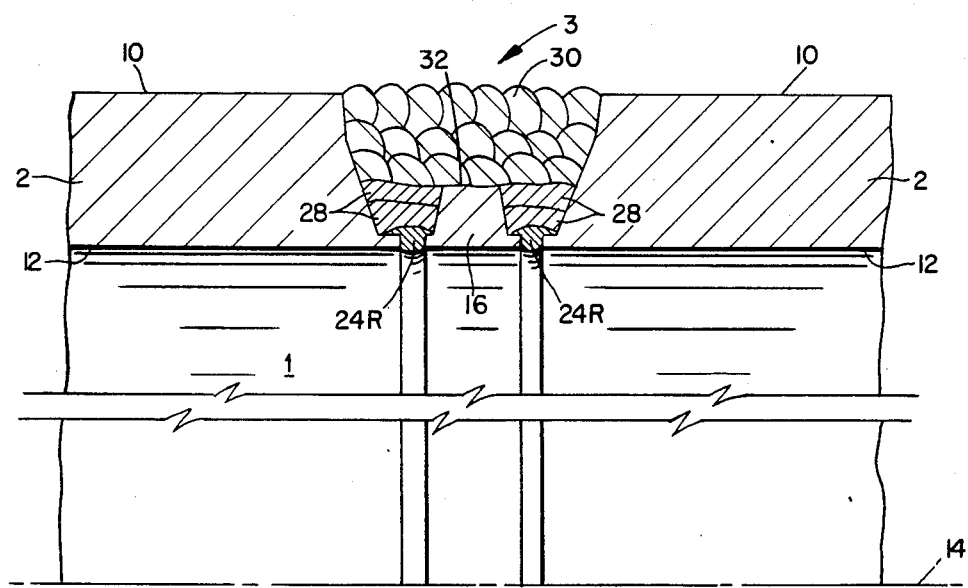
FIG. 3 is a half-sectional view showing the completed weld joint.

Referring now to FIG. 3, which again shows pipe 1 in half section, the fusible inserts are fused, preferably by arc welding, to create a root layer 24R on each side of bridge ring 16. During this step, the aperture through which inert gas is supplied to the inside of the pipe is kept open. The inert gas atmosphere, which is maintained in the pipe interior during the welding step, inhibits oxidation in the gap region. Similarly, it is preferable to employ an arc welding process, such as gas tungsten arc welding, which directs a stream of inert gas, such as argon, at the immediate area being welded to create an external inert gas atmosphere which inhibits oxidation externally of the pipe during welding.

Following the welding step, which establishes root layers 24R, one or more additional layers 28 of fusible material are deposited on each root layer 24R, again by the use of an arc welding process such as gas tungsten arc welding. The additional layers consist substantially of the same type of fusible material as inserts 24. Thus, in the preferred embodiment, type ER308L welding wire may be used. At least one layer 28 is deposited in each gap portion. However, it is necessary to determine and deposit the number of layers 28 required to prevent further fusion of each root layer through layers 28 when a subsequent layer is applied. To achieve this in the preferred embodiment, two layers 28 are deposited on each side of the bridge ring. Each additional layer 28 is preferably deposited as a single bead of fusible material of substantially uniform thickness. Upon completion of the deposition of layers 28, the aperture through which the inert gas atmosphere inside pipe 1 was maintained, is closed. This is preferably carried out by inserting a piece of the same fusible material and arc welding it in place.

During the next step of the operation, water is introduced into the interior of the pipe in order to wash away the water soluble diaphragms, as well as the tape by which they adhere to the interior surface of pipe 1 and the inert gas inside the pipe. The protection against oxidation afforded by the inert gas is no longer necessary once a sufficient number of layers 28 has been deposited. This step clears the pipe for the subsequent operation.

A liquid coolant is next introduced into the interior of the pipe to act as a heat sink in the area of the gap. The coolant is preferably water which is provided in sufficient quantity to absorb heat that is locally generated during the subsequent welding operation. In the latter operation, further layers 30 of a fusible material are deposited in gap 3. Each layer 30 extends throughout the full width of the gap and it coaxially encircles its underlying surface. Each layer 30 is deposited as a plurality of beads of substantially uniform thickness. A sufficient number of the latter layers are deposited to fill gap 3 substantially to the level of exterior surface 10 of pipe 1.

Layers 30 preferably consist of a type of fusible material which is corrosion resistant and similar to the material used for inserts 24 and layers 28. For a type 304 stainless steel pipe, a type 316L stainless steel ring and the fusible material previously identified for inserts 24 and layers 28, the type of fusible material used for layers 30 may consist of welding wire commercially available as type E308L welding wire. A welding process such as shielded metal arc welding is employed in the preferred embodiment of the invention to deposit layers 30. It will be clear, however, that other welding processes may be employed and will readily suggest themselves to those skilled in the art. As a final step, upon completion of the deposition of layers 30, the coolant is removed from the pipe.

The presence of the interior coolant during the deposition of layers 30 serves to redistribute the tensile and compressive stresses built up in the gap area which results from the localized application of heat during the arc welding operation. The redistribution of tensile and compressive stresses, in turn, enhances the resistance of the new weld joint to intergranular stress corrosion at the interior surface in contact with the corrosive environment and helps assure that its quality is such as to meet applicable safety and inspection standards.

It will be clear that other stress redistribution techniques, per se known to the art, may be used. For example, a post welding treatment such as exterior induction heating with interior cooling may be used to favorably redistribute the built up stress. In the context of the present invention, the use of the last-recited treatment requires that a liquid coolant, such as water, be introduced into the pipe only after the replacement of the weld joint is complete. While the coolant is maintained in contact with the interior of the pipe in the area of the completed joint, the exterior surface of the pipe is heated by electromagnetic induction. The resulting temperature differential across the pipe wall changes the residual stress distribution normally obtained after welding. Heat is maintained until the desired stress redistribution is achieved.

While a preferred and other embodiments of the invention have been described and illustrated in the context of replacing a defective circumferential weld joint in a pipe, it will be obvious to those skilled in the art that the invention is not so limited. For example, the invention herein can be used to weld together a pair of separate pipe sections having substantially equal inside and outside diameters. Further, the method is not limited to joining pipe sections which consist of austenitic stainless steel and it may be successfully practiced utilizing different welding techniques, different inert gases and different types of fusible materials. Additionally, the method may be used to repair a pipe defect occurring at a location other than a weld joint. In such a case, a circumferential section of the pipe containing the defect could be cut out, resulting in a gap similar in kind to that discussed in the preferred embodiment. The invention can then be used to rejoin the pipe by replacing the defective portion with a joint of suitable integrity.

While the preferred embodiment herein has been described as using two different types of weld processes (gas tungsten arc welding and shielded metal arc welding) and fusible materials of similar composition (ER308L and E308L), other combinations of weld processes and materials are possible. For example, all the fusible materials used may be deposited by the gas tungsten arc welding process. Also, the fusible materials used for inserts 24, layers 28 and layers 30, may all differ in composition from one another. However, in accordance with the present invention, all such materials must be resistant to the corrosion environment involved and they must be weld compatible with the pipe and ring materials being welded. The invention herein is likewise applicable where the pipe and the ring or the two pipes being joined each consist of a substantially different type of material. For example, the invention may be applied to join a section of stainless steel pipe to one composed of nickel alloys or carbon steel.

In preparation for welding, pipe and ring edge surface contours may be utilized that are different from those shown, the sole criterion being to create a new joint of acceptable integrity. Further, the invention may be practiced without the use of discrete fusible inserts. Thus, a skilled welder may be capable of depositing the root layers by adding fusible filler material, e.g. from a welding wire, while the welding operation is performed. Additionally, while the preferred embodiment utilizes only a pair of diaphragms, i.e. one located on each side of the gap, multiple diaphragms may be positioned on each side of the gap if it is desired to improve the tightness of the gas seal. It will also be understood that, although water is the preferred liquid coolant since it is readily available, other coolants could be utilized to serve as heat sinks.

While the preferred embodiment illustrated herein comprises specific materials, apparatus and techniques, it will be obvious to those skilled in the art that numerous modifications, changes, variations, substitutions and equivalents, in whole or in part, will now occur to those skilled in the art without departing from the spirit and scope of the invention. Accordingly, it is intended that the invention herein be limited only by the scope of the appended claims.

What is claimed is:

1. A method of joining a pair of metal pipe sections having substantially equal inside and outside diameters, said pipe sections being positioned such that a pair of pipe edge surfaces coaxially confront each other and define a circumferential gap therebetween, said method comprising the steps of:

positioning an annular metal bridge ring in said gap coaxially with said pipe sections, said ring having a smaller wall thickness than said pipe sections, the interior surfaces of said ring and said pipe sections having substantially the same diameter, said ring further including a pair of ring edge surfaces each facing one of said pipe edge surfaces;

providing an atmosphere of inert gas inside said pipe sections and said ring to inhibit oxidation in the area of said gap during subsequent fusing steps;

positioning fusible inserts on opposite sides of said ring, each of said inserts being bracketed by a pair of edge surfaces belonging to said ring and one of said pipe sections;

fusing each of said inserts to its bracketing pair of edge surfaces wherein portions of the inserts and bracketing edge surfaces make contact to provide a root layer therebetween and to thereby contact portions of said pair of coaxially confronting pipe edge surfaces through the metal bridge ring;

depositing at least one additional layer of fusible material by welding on each of said root layers between said bracketing edge surfaces up to a predetermined thickness, each of said additional layers coaxially encircling its underlying surface and being fused by welding thereto and to the contacted portions of said bracketing edge surfaces;

removing said inert gas atmosphere; and depositing further layers of a fusible material by welding in said gap and fusing said material to the underlying surfaces and to the contacted portions of said pipe edge surfaces, each of said further wedling layers extending throughout the full width of said gap and coaxially encircling its underlying surface. said further layers being successively deposited until said gap is filled substantially to the level of the exterior surfaces of said pipe sections and a unitary pipe is formed.

2. The method of claim 1, wherein each of said further layers is deposited as a plurality of beads of fusible material of substantially uniform thickness;

said fusible inserts, said additional layers and said further layers consisting substantially of the same type of fusible material; and said predetermined thickness of said additional layers being effective to prevent further fusion of said root layers during subsequent fusing operations.

3. The method of claim 1, wherein said pipe sections and said ring consist of different metals capable of being joined by fusing;

said fusible inserts and said additional layers consisting substantially of a first type of corrosion resistant, fusible material compatible with said pipe sections and said ring; and said further layers consisting substantially of a second type of corrosion resistant, fusible material compatible with said pipe sections and said ring.

4. The method of claim 1 and further including the step of providing a liquid coolant inside said pipe sections at least in the area of said gap following the removal of said inert gas atmosphere, said coolant being adapted to act as a heat sink during the deposition of said further layers of fusible material.

5. The method of claim 1 and further including the steps of:

providing a liquid coolant inside said pipe at least in the area of said gap following the deposition of said further layers of fusible material, said coolant being adapted to act as a heat sink during subsequent heat application; and applying heat to the exterior surface of said pipe at least in the area of said gap to redistribute stress in the pipe material in said gap area.

6. The method of claim 5, in which said application of heat to the exterior surface of said pipe includes the step of electromagnetically inducing heating in said gap area of said pipe.

7. The method of claim 1 and further comprising the step of providing substantially gas tight dams in said pipe sections on opposite sides of said gap before said bridge ring is positioned in said gap;

said step of providing said inert gas atmosphere including the further steps of:

providing a small aperture between one of said bracketing pairs of edge surfaces;

piping said inert gas into said gap area through said aperture;

maintaining said inert gas under positive pressure in said gap area inside said pipe; and closing said aperture following the deposition of said additional layer by the insertion of additional fusible material fused into place in said aperture.

8. The method of claim 7 wherein said dams are water soluble, and said removal of said inert gas atmosphere comprises the step of washing said dams and said gas away in said pipe sections with water introduced into said gap area.

9. The method of claim 7, wherein said step of providing said dams further comprises:

inserting at least a pair of gas tight, water soluble diaphragms through said gap into the interior of said pipe sections, each of said diaphragms having a diameter substantially equal to the inside diameter of said pipe sections; and adhering said diaphragms to the interior surfaces of said pipe sections on opposite sides of said gap to seal off said gap area.

10. The method of claim 1, in which all fusing operations are carried out by means of arc welding.

11. The method of claim 3, wherein said pipe sections and said ring consist substantially of different types of austenitic stainless steel.

12. The method of claim 1, wherein each of said fusible inerst is substantially ring shaped with an inside diameter substantially equal to that of said pipe sections.

13. The method of claim 1, wherein the positioning of said fusible inserts on opposite sides of said ring comprises the step of feeding wire-shaped, fusible filler material into the space defined by each of said pairs of edge surfaces concurrently with said fusing step.

14. A method of replacing a defective butt weld in a metal pipe, said butt weld being bracketed by a pair of adjacent weld heat-affected zones, said method comprising the step of:

removing said butt weld and said heat-affected zones from said pipe to provide a circumferential gap between a pair of coaxial, confronting pipe edge surfaces;

shaping each of said confronting pipe edge surfaces to a predetermined configuration;

positioning an annular metal bridge ring in said gap coaxial with said pipe, said ring having a smaller wall thickness than said pipe and an interior diameter substantially equal to the interior pipe diameter, said ring including a pair of edge surfaces each having a predetermined configuration and facing one of said pipe edge surfaces;

providing an atmosphere of inert gas inside said pipe to inhibit oxidation in the area of said gap during subsequent fusing steps;

positioning fusible inserts on opposite sides of said ring, each of said inserts being bracketed by a pair of edge surfaces belonging to said ring and said pipe respectively;

fusing each of said inserts to its bracketing pair of edge surfaces whereby portions of the inserts and bracketing edge surfaces make contact to provide a root layer therebetween and to thereby contact portions of said pair of coaxially confronting pipe edge surfaces through the metal bridge ring;

depositing additional layers of fusible material by welding on each of said root layers between said bracketing edge surfaces up to a predetermined thickness, each of said additional layers coaxially encircling its underlying surface and being fused by welding thereto and to the contacted portions of said bracketing edge surfaces;

removing said inert gas atmosphere; and depositing further layers of a fusible material by welding in said gap and fusing said material to the underlying surface and to the contacted portions of said pipe edge surfaces, each of said further welding layers extending throughout the full width of said gap and coaxially encircling its underlying surface, said further layers being successively deposited until said gap is filled substantially to the level of the exterior surface of said pipe and the integrity of said pipe is reestablished.

15. The method of claim 14, wherein said shaping step includes the further step of machining each of said confronting pipe edge surface to provide a plurality of substantially planar pipe edge surface portions within the wall thickness of said pipe, respective pairs of said pipe edge surface portions being symmetrically disposed about the center of said gap, a pair of first pipe edge surface portions being dipsosed adjacent the interior pipe surface in mutually spaced planes substantially perpendicular to the axis of said pipe to define a first gap section therebetween, a pair of second pipe edge surface portions extending outward in opposite axial directions from said first gap section, a pair of third pipe edge surface portions inclining outward in opposite directions from said second pipe edge surface portions at a predetermined angle with respect to perpendicular to said pipe axis, and a pair of fourth pipe edge surface portions extending between said third pipe edge surface portions and the exterior pipe surface and inclining outward at an angle steeper with respect to perpendicular to said pipe axis.

16. The method of claim 15 wherein said edge surfaces of said ring are configured to provide a plurality of substantially planar ring edge surface portions within the wall thickness of said ring, a pair of mutually spaced first ring edge surface portions being disposed adjacent the interior ring surface and being substantially parallel to said first pipe edge surface portions, each of said first edge surface portions of said ring facing one of said first edge surface portions of said pipe to define a pair of narrow gap portion within said first gap section, a pair of said second ring edge surface portions extending axially inward toward said gap center from said pair of narrow gap portions, and a pair of third ring edge surface portions extending between said second ring edge surface portions and the exterior ring surface and inclining inward toward said gap center.

17. The method of claim 14 wherein each of said further layers of fusible material is deposited as a plurality of beads of substantially uniform thickness;

said fusible inserts, said additional layers and said further layers consisting substantially of the same type of fusible material; and said predetermined thickness of said additional layers being effective to prevent further fusion of said root layers during subsequent fusing operations.

18. The method of claim 14 wherein said pipe and said ring consist of different metals capable of being joined by fusing;

said fusible insert and said additional layers consisting substantially of a first type of corrosion resistant, fusible material compatible with said pipe and said ring; and said further layers consisting substantially of a second type of corrosion resistant, fusible material compatible with said pipe and said ring.

19. The method of claim 14 and further including the step of providing a liquid coolant inside said pipe at least in the area of said gap following the removal of said inert gas atmosphere, said coolant being adapted to act as a heat sink during the deposition of said further layers of fusible material.

20. The method of claim 14 and further including the steps of:

providing a liquid coolant inside said pipe at least in the area of said gap following the deposition of said further layers of fusible material, said coolant being adapted to act as a heat sink during subsequent heat application; and applying heat to the exterior surface of said pipe at least in the area of said gap to redistribute stress in said gap area of said pipe.

21. The method of claim 20, in which said application of heat to the exterior surface of said pipe includes the step of electromagnetically inducing heating in said gap area of said pipe.

22. The method of claim 14 and further comprising the step of providing substantially gas tight dams in said pipe on opposite sides of said gap before said bridge ring is positioned in said gap;

said step of providing said inert gas atmosphere including the further steps of:

providing a small aperture between one of said bracketing pairs of edge surfaces;

piping said inert gas into said gap area through said aperture;

maintaining said inert gas under positive pressure in said gap area inside said pipe; and closing said aperture following the deposition of said additional layers by the insertion of additional fusible material fused into place in said aperture.

23. The method of claim 22, wherein said dams are water soluble, said removal of said inert gas atmosphere comprising the step of washing said dams and said gas away in said pipe with water introduced into said gap area.

24. The method of claim 22, wherein said step of providing said dams further comprises:

inserting at least a pair of gas tight, water soluble diaphragms through said gap into the interior of said pipe, each of said diaphragms having a diameter substantially equal to the inside diameter of said pipe; and adhering said diaphragms to the interior surface of said pipe on opposite sides of said gap to provide gas resistant seals in said gap area.

25. The method of claim 14, in which all fusing operations are carried out by means of arc welding.

26. The method of claim 18, wherein said pipe and said ring consist substantially of different types of austenitic stainless steel.

27. The method of claim 14, wherein each of said fusible inserts is substantially ring shaped with an inside diameter substantially equal to that of said pipe.

28. The method of claim 14, wherein positioning of said fusible inserts on opposite sides of said ring comprises the step of feeding wire-shaped, fusible filler material into the space defined by each of said pairs of edge surfades concurrently with the following fusing step.

29. A method of replacing a defective butt weld in a metal pipe consisting substantially of austenitic stainless steel, said butt weld being bracketed by a pair of adjacent weld heat-affected zones, said method comprising the steps of:

removing said butt weld and said heat-affected zones from said pipe to provide a circumferential gap between a pair of pipe sections having coaxially confronting pipe edge surfaces;

machining said confronting pipe edge surfaces to provide a plurality of substantially planar, pipe edge surface portions within the wall thickness of each pipe section, respective pairs of said pipe edge surface portions being symmetrically disposed about the center of said gap, a pair of first pipe edge surface portions lying in a pair of mutually spaced planes substantially perpendicular to the common axis of said pipe sections to define a first gap section therebetween, a pair of second pipe edge surface portions extending outward in opposite axial directions from said first gap section, the remaining pipe edge surface portions each inclining outward such that the angle of inclination of said common axis is steepest for the pipe edge surface portions adjacent the exterior surface of said pipe;

inserting at least a pair of gas tight water soluble diaphragms through said gap into the interior of said pipe on opposite sides of said gap, each of said diaphragms having a diameter substantially equal to the inside diameter of said pipe;

adhering said diaphragms to the interior surface of said pipe on opposite sides of said gap to seal off the area of said gap;

positioning an annular bridge ring consisting substantially of austenitic stainless steel in said gap coaxial with said pipe, said ring having a smaller wall thickness than said pipe and an interior diameter substantially equal to the interior pipe diameter, said ring including a pair of edge surface each facing one of said pipe edge surface and being configured to provide a plurality of substantially planar ring edge surface portions within the wall thickness of said ring, respective pairs of said ring edge surface portions being symmetrically disposed about the center of said gap, a pair of multually spaced first ring edge surface portions substantially parallel to said first pipe edge surface portions and spaced from the latter to define a pair of narrow gap portions within said first gap section, a pair of second ring edge surface portions extending axially inward toward said gap center from said pair of gap portions, and a pair of third ring edge surface portions extending between said second ring edge surface portions and the exterior ring surface and inclining inward toward said gap center;

providing a small aperture between one of said bracketing pairs of edge surfaces;

piping an inert gas into said gap area through said aperture to inhibit oxidation inside said pipe in said gap area;

maintining said inert gas under positive pressure in said gap area inside said pipe;

positioning fusible inserts on opposite sides of said ring, each of said inserts being bracketed by a pair of edge surfaces belonging to said ring and said pipe sections, said inserts consisting substantially of a corrosion resistant, fusible material comparible with said stainless steel;

welding each of said inserts to its bracketing pair of edge surfaces whereby poritons of the inserts and bracketing edge surfaces make contact to provide a root layer of fusible material therebetween and to thereby contact portions of said pair of coaxially confronting pipe edge surfaces through the metal bridge ring;

depositing additional layers of said corrosion resistant, fusible material by welding on each of said root layers between said bracketing edge surface up to a predetermined thickness, said predetermined thickness being selected to prevent further fusion of said root layers during subsequent fusing operations, each of said additional layers being deposite by welding as a plurality of beads of said fusible material of substantially uniform thickness and being welded to its underlying layer and to the contacted portions of said bracketing edge surfaces, each of said additional layers coaxially encircling its underlying surface;

welding said aperture closed;

removing said inert gas atmopshere by washing said diaphragms and said gas away with water introduced into said said gap region;

providing a liquid coolant inside said pipe at least in said gap area, said coolant being adapted to act as a heat sink for locally applied heat; and depositing further layers of a fusible material in said gap by welding to the underlying surface and to the contacted portions of said pipe edge surfaces, said further layers consisting substantially of said corrosion resistant, fusible material compartible with said stainless steel, each of said further layer extending throughout the full width of said gap and coaxially encircling its underlying surface, said further layers each being deposited as a plurality of beads of substantially uniform thickness of said fusible material unitl said gap is filled substantially to the level of the exterior surface of said pipe and the integrity of said pipe is reestablished.

* * * * *